(12) United States Patent
Huang

(10) Patent No.: US 12,038,199 B2
(45) Date of Patent: Jul. 16, 2024

(54) PURIFIER

(71) Applicants: GD Midea Environment Appliances Mfg. Co., Ltd., Zhongshan (CN); Midea Group Co., Ltd., Foshan (CN)

(72) Inventor: Jihua Huang, Zhongshan (CN)

(73) Assignees: GD MIDEA ENVIRONMENT APPLIANCES MFG CO., LTD., Dongfeng (CN); MIDEA GROUP CO., LTD., Foshan (CN)

( * ) Notice: Subject to any disclaimer, the term of this patent is extended or adjusted under 35 U.S.C. 154(b) by 453 days.

(21) Appl. No.: 17/339,829

(22) Filed: Jun. 4, 2021

(65) Prior Publication Data

US 2021/0293423 A1    Sep. 23, 2021

Related U.S. Application Data

(63) Continuation of application No. PCT/CN2018/125539, filed on Dec. 29, 2018.

(30) Foreign Application Priority Data

Dec. 6, 2018 (CN) .......................... 201811492346.2

(51) Int. Cl.
*F24F 6/00* (2006.01)
*F24F 8/108* (2021.01)
*F24F 8/80* (2021.01)

(52) U.S. Cl.
CPC ................ *F24F 6/00* (2013.01); *F24F 8/108* (2021.01); *F24F 8/80* (2021.01)

(58) Field of Classification Search
CPC ................ F24F 8/80; F24F 6/00; F24F 8/108
See application file for complete search history.

(56) References Cited

U.S. PATENT DOCUMENTS

2019/0353362 A1*  11/2019  Montagnino ........... F24F 8/108

FOREIGN PATENT DOCUMENTS

| CN | 1403751 A | 3/2003 |
|---|---|---|
| CN | 201748839 U | 2/2011 |
| CN | 204100449 U | 1/2015 |
| CN | 204513677 U | 7/2015 |
| CN | 106415144 A | 2/2017 |
| CN | 206504433 U | 9/2017 |
| CN | 107525194 A | 12/2017 |
| CN | 107575980 A | 1/2018 |
| CN | 108413526 A | 8/2018 |
| CN | 108413526 A * | 8/2018 |

(Continued)

OTHER PUBLICATIONS

CN-108413526-A translation.*

(Continued)

*Primary Examiner* — Elizabeth J Martin
(74) *Attorney, Agent, or Firm* — Morgan, Lewis & Bockius LLP

(57) ABSTRACT

A purifier includes a housing, including an air outlet and an air duct communicating with the air outlet; a fan installed in the air duct; and a humidification device installed in the housing and located outside the air duct. The humidification device includes an ultrasonic atomization assembly and an exhaust pipe, one end of the exhaust pipe is connected to the ultrasonic atomization assembly, and another end of the exhaust pipe is extended into the air duct.

16 Claims, 6 Drawing Sheets

(56) References Cited

FOREIGN PATENT DOCUMENTS

| CN | 208120910 U | 11/2018 |
|---|---|---|
| JP | S 55164441 U | 11/1980 |
| JP | 2013511692 A | 4/2013 |
| JP | 2014-112030 A | 6/2014 |
| JP | 2015157070 A | 9/2015 |
| JP | 2016125739 A | 7/2016 |
| JP | 3214558 U | 1/2018 |
| JP | 2018044762 A | 3/2018 |
| WO | WO 2015182738 A1 | 12/2015 |

OTHER PUBLICATIONS

Midea Group Co., Ltd., First Office Action, Japanese Patent Application No. 2021-531471, Apr. 26, 2022, 10 pgs.

GD Midea Environment Appliances MFG. Co., Ltd., The First Office Action, CN Application No. 201811492346.2, Dec.3, 2020, 17 pgs.

GD Midea Environment Appliances MFG., Co., Ltd., The Second Office Action, CN Application No. 201811492346.2, Jul. 2, 2021, 21 pgs.

GD Midea Environment Appliances MFG., Co., Ltd., International Search Report and Written Opinion, PCT/CN2018/125539, Jul. 22, 2019, 12 pgs.

\* cited by examiner

PURIFIER

CROSS-REFERENCE TO RELATED APPLICATIONS

This application is a continuation of PCT International Application No. PCT/CN2018/125539, filed Dec. 29, 2018, which claims the benefit of Chinese Application No. 201811492346.2, filed on Dec. 6, 2018, filed with China National Intellectual Property Administration, and entitled "PURIFIER", each of which is incorporated herein by reference.

TECHNICAL FIELD

The present disclosure relates to the technical field of air purification, and in particular to a purifier.

BACKGROUND

With the continuous improvement of living standards, people's requirements for air quality have also become higher, so purifiers are gradually being favored by people. In some example embodiments, a purifier generally includes a fan assembly and a filter assembly. The working principle of the purifier is that the fan assembly drives dirty air in the room into the purifier, and then the dirty air flows out into the room after being filtered by the filter assembly, so as to achieve the purpose of cleaning and purifying the air. However, the air purified by a traditional purifier is relatively dry, which affects the quality of air purification.

SUMMARY

The main objective of the present disclosure is to provide a purifier, which aims to solve the technical problem that the air purified by the exemplary purifier is relatively dry and affects the quality of air purification.

In order to achieve the above objective, the present disclosure provides a purifier, including: a housing, including an air outlet and an air duct communicating with the air outlet; a fan installed in the air duct; and a humidification device installed in the housing and located outside the air duct; the humidification device includes an ultrasonic atomization assembly and an exhaust pipe, one end of the exhaust pipe is connected to the ultrasonic atomization assembly, and another end of the exhaust pipe is configured to extend into the air duct.

In some embodiments, a volute assembly forming the air duct is provided in the housing, the volute assembly includes a volute extending to the air outlet, an end of the volute close to the air outlet is defined with a through hole, and the exhaust pipe is inserted into the through hole.

In some embodiments, the housing includes a top plate, and the air outlet is defined on the top plate.

In some embodiments, the housing includes a side plate connected to the top plate, and the end of the volute close to the air outlet is inclined from bottom to top towards the side plate.

In some embodiments, the ultrasonic atomization assembly includes:
a base, an atomization cavity being provided on the base, an ultrasonic source being installed in the atomization cavity;
an upper housing provided above the base, the upper housing being provided with a cover corresponding to the atomization cavity, the exhaust pipe passing through the cover and communicating with the atomization cavity; and
a water tank provided on the base to provide a water source for the atomization cavity.

In some embodiments, the cover has a cavity with an opening facing downward, the cavity is connected to the atomization cavity, and the exhaust pipe is configured to pass through a side wall of the cover and communicate with the cavity.

In some embodiments, the base is provided with a water storage tank communicating with the atomization cavity, and the water tank is provided in the water storage tank.

In some embodiments, a liquid level detection device is provided in the water storage tank.

In some embodiments, a sterilization module is provided in the water storage tank.

In some embodiments, a spoiler is provided in the water storage tank, and the spoiler is located between the sterilization module and the atomization cavity.

In some embodiments, the spoiler includes a first spoiler rib and a second spoiler rib, the first spoiler rib and the second spoiler rib are enclosed to form a spoiler channel, and the spoiler channel is in communication with the atomization cavity.

In some embodiments, the first spoiler rib and the second spoiler rib are curved, and the first spoiler rib and the second spoiler rib are enclosed to form a curved spoiler channel.

In some embodiments, the first spoiler rib and the second spoiler rib are arc-shaped, and the first spoiler rib and the second spoiler rib are enclosed to form an arc-shaped spoiler channel.

In some embodiments, the second spoiler rib is configured to divide the water storage tank into a first sub-tank and a second sub-tank, the first sub-tank is in communication with the atomization cavity; a water passing hole is provided at a bottom of the second spoiler rib, and the water passing hole is in communication with the first sub-tank and the second sub-tank.

In some embodiments, the spoiler includes a plurality of spoiler bumps formed in the water storage tank.

In some embodiments, a sealing sponge is provided between the upper housing and the base.

In some embodiments, the ultrasonic atomization assembly further includes a blower, and the blower is configured to drive a gas in the atomization cavity to be discharged through the exhaust pipe.

In some embodiments, the housing includes a front panel and a rear panel opposite to the front panel, the front panel and/or the rear panel are defined with an air inlet, and the air inlet is provided with a purification module.

In some embodiments, a central partition is provided in the housing, the middle partition and the front panel and/or the rear panel are enclosed to form an installation cavity, and the purification module is installed in the installation cavity corresponding to the air inlet.

In some embodiments, the purification module is a HEPA filter.

In technical solutions of the present disclosure, a humidification device is installed outside the air duct of the purifier. The humidification device includes an ultrasonic atomization assembly and an exhaust pipe. One end of the exhaust pipe is connected to the ultrasonic atomization assembly, and another end of the exhaust pipe extends into the air duct. In this way, the steam atomized by the ultrasonic atomization assembly is discharged into the air duct through the exhaust pipe, and is collected with the air in the air duct, and finally flows out into the room through the air outlet. Thus, while the indoor air is purified, the indoor air can also be humidified, and the quality of air purification is improved.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

DESCRIPTION OF REFERENCE SIGNS

Figure 1:
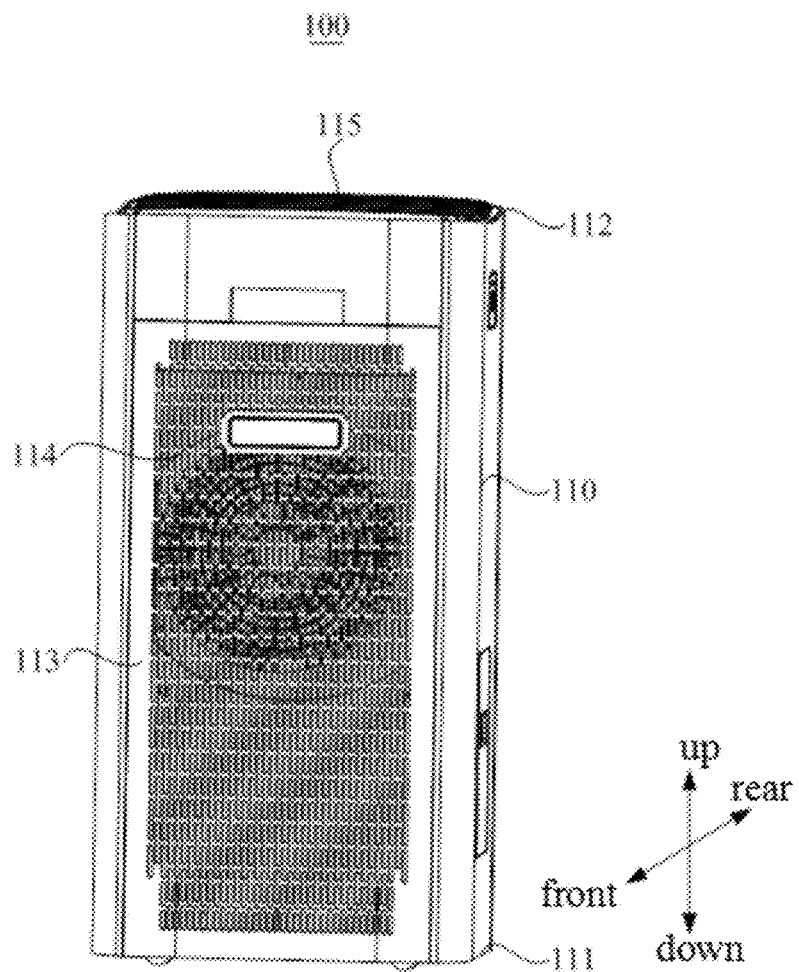
FIG. 1 is a schematic structural view of a purifier according to the present disclosure.

| Reference sign | Name |
|---|---|
| 100 | purifier |
| 110 | housing |
| 111 | bottom panel |
| 112 | top panel |
| 113 | front panel |
| 114 | air inlet |
| 115 | air outlet |
| 116 | air duct |
| 120 | volute assembly |
| 121 | volute |
| 130 | fan |
| 140 | central partition |
| 141 | installation cavity |
| 150 | humidification device |
| 150a | ultrasonic atomization assembly |
| 151 | base |
| 152 | water storage tank |
| 1521 | first sub-tank |
| 1522 | second sub-tank |
| 153 | atomization cavity |
| 154 | spoiler |
| 1541 | first spoiler rib |
| 1542 | second spoiler rib |
| 155 | water tank |
| 157 | sterilization module |
| 158 | upper housing |
| 1581 | cover |
| 159 | blower |
| 150b | exhaust pipe |

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. The meaning of "and/or" appearing in the disclosure includes three parallel schemes. For example, "A and/or B" includes only A, or only B, or both A and B.

In addition, the technical solutions between the various embodiments can be combined with each other, and be based on the realization of those of ordinary skill in the art. When the combination of technical solutions is contradictory or cannot be achieved, it should be considered that such a combination of technical solutions does not exist, nor is it within the scope of the present disclosure.

The present disclosure provides a purifier. Specifically, the purifier relates to a humidification purifier.

Figure 2:
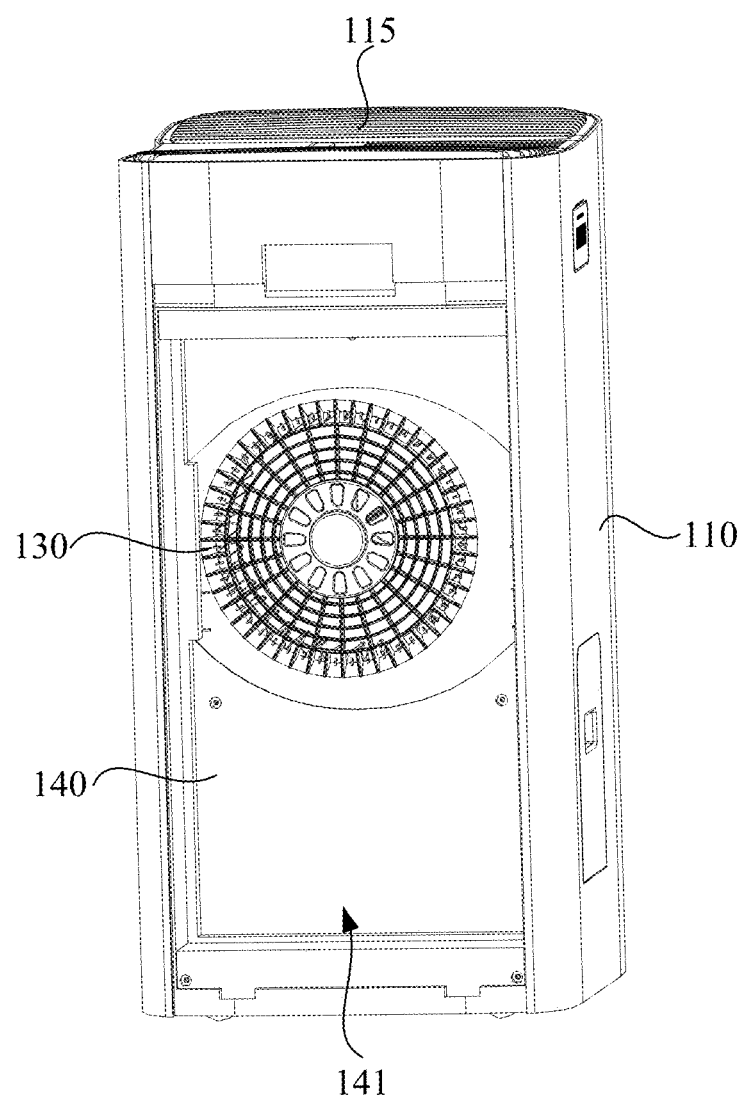
FIG. 2 is a schematic structural view of the purifier in FIG. 1 with a housing removed.
Figure 3:
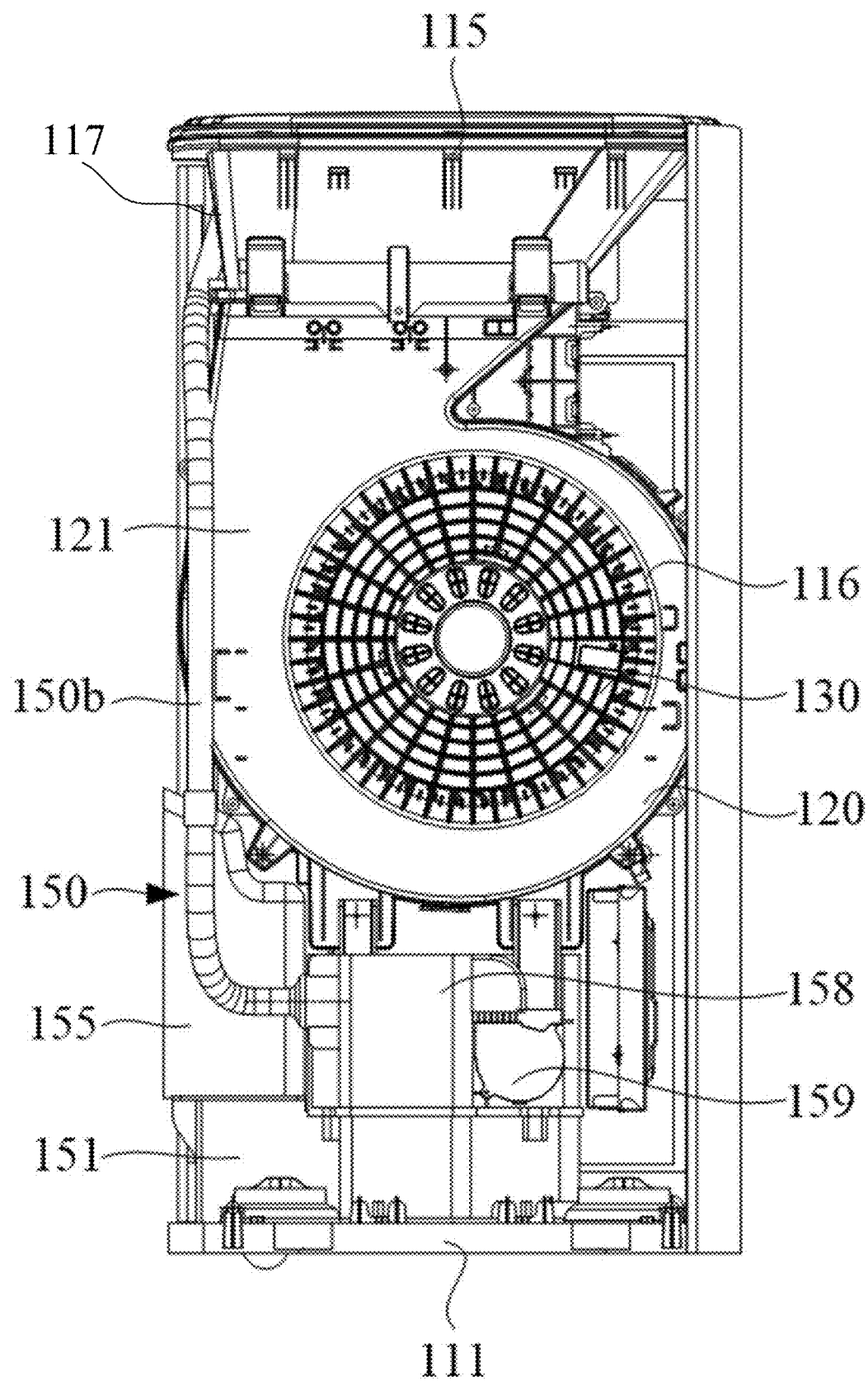
FIG. 3 is a schematic view of an internal structure of the purifier in FIG. 1.

As shown in FIG. 1 to FIG. 3, a purifier 100 of the present disclosure includes a housing 110, including an air outlet 115 and an air duct 116 communicating with the air outlet 115; a fan 130 installed in the air duct 116; and a humidification device 150 installed in the housing 110 and located outside the air duct 116. The humidification device 150 includes an ultrasonic atomization assembly 150a and an exhaust pipe 150b, one end of the exhaust pipe 150b is connected to the ultrasonic atomization assembly 150a, and another end of the exhaust pipe 150b is configured to extend into the air duct 116.

In some embodiments of the present disclosure, the housing 110 includes a front panel 113, a rear panel opposite to the front panel 113, and a top panel 112 and a bottom panel 111 connected to the front panel 113 and the rear panel. The top panel 112 is defined with the air outlet 115. The front panel 113 and/or the rear panel are defined with an air inlet 114. The air duct 116 communicates with the air inlet 114 and the air outlet 115. The fan 130 is provided in the air duct 116 to drive indoor air to enter from the air inlet 114, and then flow back into the room from the air outlet 115 after purification. The purifier 100 further includes a purification module provided in the housing 110. The installation location of the purification module is also not specifically limited. For example, the purification module can be installed at the air inlet 114 or the air outlet 115, or it can be installed in the air duct 116. In some embodiments, the air inlet 114 is provided with the purification module. Specifically, a middle partition 140 is provided in the housing 110. The middle partition 140 and the front panel 113 and/or the rear panel are enclosed to form an installation cavity 141. The purification module is installed in the installation cavity 141 corresponding to the air inlet 114. The middle partition 140 is provided with an air passage hole, and the air passage hole communicates with the air inlet 114 and the air duct 116. In this way, indoor air enters from the air inlet 114, is purified by the purification module, then enters the air duct 116, and finally flows back into the room from the air outlet 115, thereby purifying the indoor air. In some embodiments of the present disclosure, the purification module is a HEPA filter, of course, it is not limited to this.

As shown in FIG. 3, the humidification device 150 is installed on the bottom panel 111 and located outside the air duct 116. It can be understood that, if the humidification device 150 is installed in the air duct 116, after being humidified by the humidification device 150, the air in the air duct 116 flows back into the room from the air outlet 115. However, when the humidified air flows in the air duct 116, it is easy to adhere to the wall and produce condensed water, thereby causing water spray problem. Therefore, in some embodiments of the present disclosure, the humidification device 150 is provided outside the air duct 116, the atomized steam generated by the humidification device 150 is discharged to the air duct 116 through the exhaust pipe 150b, which can effectively avoid the water spray problem.

Figure 4:
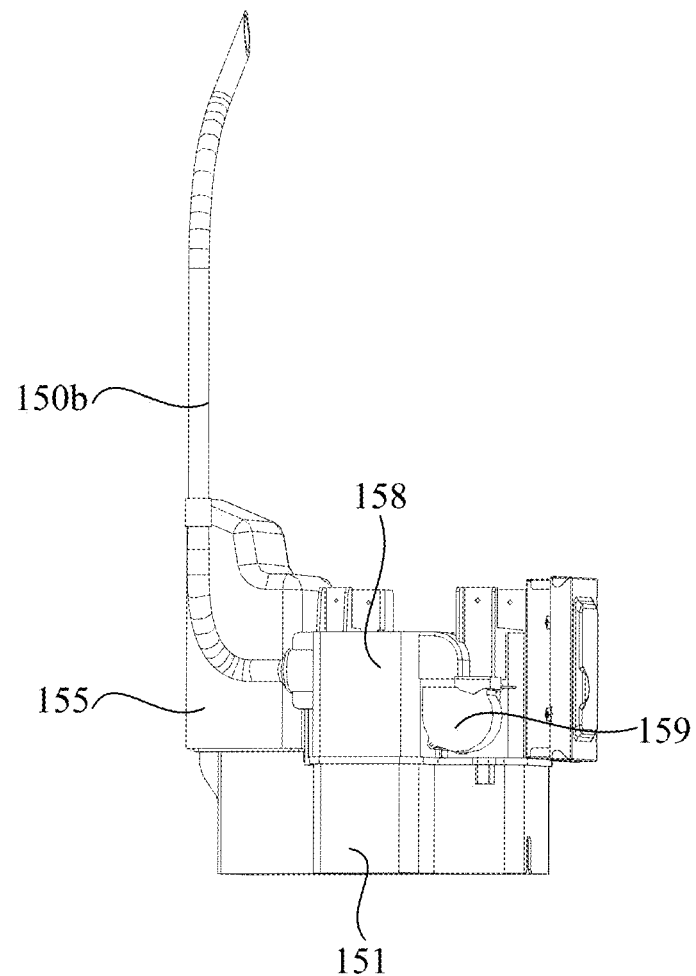
FIG. 4 is a schematic structural view of a humidification device in FIG. 1.
Figure 5:
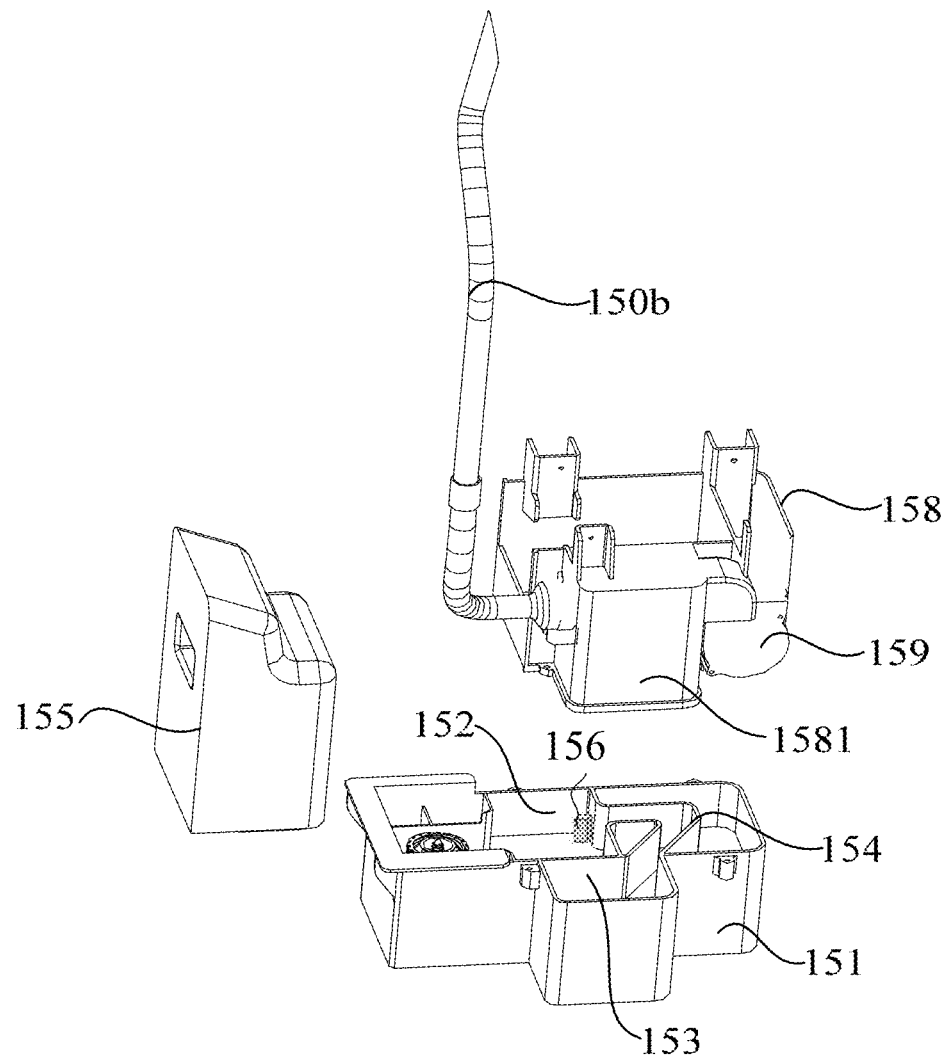
FIG. 5 is an exploded schematic structural view of the humidification device in FIG. 1.

The humidification device 150 can have various structures, which are not specifically limited here. For example, in some embodiments of the present disclosure, the humidification device 150 includes an ultrasonic atomization assembly 150a. The ultrasonic atomization assembly 150a includes a base 151, an upper housing 158, an ultrasonic source (not shown), and a water tank 155. An atomization cavity 153 is provided on the base 151, and an ultrasonic source is installed in the atomization cavity 153. Specifically, the ultrasonic source is an atomization oscillator. As shown in FIG. 4 and FIG. 5, the upper housing 158 is provided above the base 151. The upper housing 158 is provided with a cover 1581 corresponding to the atomization cavity 153. The exhaust pipe 150b is configured to pass through the cover 1581 and communicate with the atomization cavity 153. It should be noted that the cover 1581 can also have various structures. For example, the cover 1581 has a cavity with an opening facing downwards. The cavity is communicated with the atomization cavity 153, and the exhaust pipe 150b is configured to pass through a side wall of the cover 1581 and communicate with the cavity. The cover 1581 may also be plate-shaped. The cover 1581 is mounted on the atomization cavity 153. The exhaust pipe 150b is configured to pass through the cover 1581 and directly communicate with the atomization cavity 153. The water tank 155 is provided on the base 151 to provide a water source for the atomization cavity 153. In addition, the ultrasonic atomization assembly 150a further includes a blower 159 configured to drive the gas in the atomization cavity 153 to be discharged through the exhaust pipe 150b. During operation, the water in the water tank 155 flows out into the atomization cavity 153 on the base 151, and is atomized into steam by the ultrasonic source in the atomization cavity 153. The steam is driven by the blower 159 to be discharged to the air duct 116 through the exhaust pipe 150b, and is coalesced with the air in the air duct 116, and finally flows out into the room through the air outlet 115.

In technical solutions of the present disclosure, a humidification device 150 is installed outside the air duct 116 of the purifier 100. The humidification device 150 includes an ultrasonic atomization assembly 150a and an exhaust pipe 150b. One end of the exhaust pipe 150b is connected to the ultrasonic atomization assembly 150a, and another end of the exhaust pipe 150b extends into the air duct 116. In this way, the steam atomized by the ultrasonic atomization assembly 150a is discharged into the air duct 116 through the exhaust pipe 150b, and is coalesced with the air in the air duct 116, and finally flows out into the room through the air outlet 115. Thus, when the indoor air is purified, the indoor air can also be humidified, and the quality of air purification is improved.

As shown in FIG. 3, a volute assembly 120 forming the air duct 116 is provided in the housing 110, the volute assembly 120 includes a volute 121 extending to the air outlet 115, an end of the volute 121 (an air outlet end) close to the air outlet 115 is defined with a through hole 117, and the exhaust pipe 150b is inserted into the through hole 117. The steam atomized by the ultrasonic atomization assembly 150a is driven by the blower 159 and is discharged to the air outlet end of the air duct 116 through the exhaust pipe 150b, which is more conducive to prevent the generation of condensed water and effectively avoids the water spray problem.

Considering that the exhaust pipe 150b is inserted into the through hole 117 of the volute 121, in order to facilitate the fixing and installation of the exhaust pipe 150b, the end of the volute 121 close to the air outlet 115 is inclined from bottom to top toward the side plate. In this way, the end of the volute 121 close to the air outlet 115 forms an angle with the vertical direction, which facilitates the insertion of the exhaust pipe 150b into the through hole 117.

Figure 6:
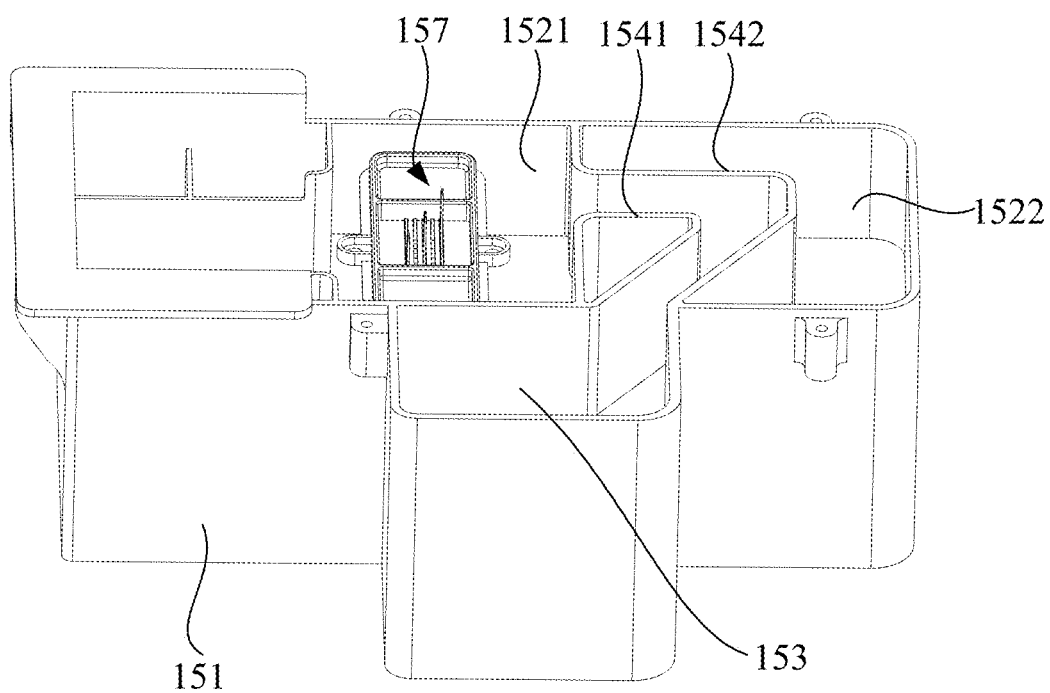
FIG. 6 is a schematic structural view of a base in FIG. 5.

As shown in FIG. 4, FIG. 5 and FIG. 6, the base 151 is provided with a water storage tank 152 communicating with the atomization cavity 153, and the water tank 155 is provided in the water storage tank 152 to supply water to the water storage tank 152. Here, in order to more accurately control the amount of water in the water storage tank 152, a liquid level detection device 156 may be provided in the water storage tank 152 to detect the liquid level in the water storage tank 152. For example, if the liquid level detection device 156 detects that the liquid level in the water storage tank 152 is lower than a preset value, it sends a water addition signal to the electric control board of the purifier 100. The electric control board can control the water tank 155 to add water to the water storage tank 152 according to the water addition signal.

Considering that the humidification device 150 is provided outside the air duct 116, the atomized steam generated by the humidification device 150 is discharged to the air outlet end of the air duct 116 through the exhaust pipe 150b, and is coalesced with the purified air in the air duct 116, thereby purifying and humidifying the indoor air. Since the atomized steam has not undergone purification treatment, when the atomized steam is mixed with the purified air in the air duct 116, the overall purification effect may be affected. Therefore, in order to better realize the purification function of the purifier 100, in some embodiments, a sterilization module 157 is provided in the water storage tank 152. Specifically, the sterilization module 157 is provided on the flow path between the water tank 155 and the atomization cavity 153. In this way, after the water in the water tank 155 flows into the water storage tank 152, it is first sterilized by the sterilization module 157, and then flows into the atomization cavity 153, where it is atomized into steam by the ultrasonic source in the atomization cavity 153.

In some embodiments, in order to ensure that the water in the water storage tank 152 is fully sterilized, the sterilization effect of the sterilization module 157 is improved, a spoiler 154 may be provided in the water storage tank 152, and the spoiler 154 is located between the sterilization module 157 and the atomization cavity 153. The spoiler 154 can slow down the flow rate of the water in the water storage tank 152 to the atomization cavity 153, thus the contact time between the water in the water storage tank 152 and the sterilization module 157 is increased, thereby facilitating the sterilization module 157 to fully sterilize the water in the water storage tank 152. The spoiler 154 has a variety of structures. For example, as shown in FIG. 6, the spoiler 154 includes a first spoiler rib 1541 and a second spoiler rib 1542, the first spoiler rib 1541 and the second spoiler rib 1542 are enclosed to form a spoiler channel, and the spoiler channel is in communication with the atomization cavity 153. For another example, the spoiler 154 includes a plurality of spoiler bumps formed in the water storage tank 152. There is no specific limitation here.

In order to further slow down the flow rate of the water in the water storage tank 152 to the atomization cavity 153, and further increase the contact time between the water in the water storage tank 152 and the sterilization module 157, in some embodiments, the first spoiler rib 1541 and the second spoiler rib 1542 are curved, and the first spoiler rib 1541 and the second spoiler rib 1542 are enclosed to form a curved spoiler channel. Understandably, in other embodiments, the first spoiler rib 1541 and the second spoiler rib 1542 may also be arc-shaped, and the first spoiler rib 1541 and the second spoiler rib 1542 are enclosed to form an arc-shaped spoiler channel.

As shown in FIG. 6, the second spoiler rib 1542 is configured to divide the water storage tank 152 into a first sub-tank 1521 and a second sub-tank 1522, the first sub-tank 1521 is in communication with the atomization cavity 153. The first spoiler rib 1541 is located in the first sub-tank 1521. A water passing hole is provided at a bottom of the second spoiler rib 1542, and the water passing hole is in communication with the first sub-tank 1521 and the second sub-tank 1522. When the water in the first sub-tank 1521 flows into the atomization cavity 153 through the spoiler channel, part of the water in the spoiler channel can flow into the second sub-tank 1522 from the water passing hole. In this way, on one hand, the flow rate of the water in the first sub-tank 1521 to the atomization cavity 153 is slowed down, the contact time between the water in the first sub-tank 1521 and the sterilization module 157 is increased, thereby facilitating the sterilization module 157 to fully sterilize the water in the first sub-tank 1521. On the other hand, it can also prevent the liquid level in the first sub-tank 1521 from being too high and causing water to overflow.

Based on the above embodiments, in order to prevent the steam in the atomization cavity 153 from escaping and weakening the humidification effect, a sealing sponge may be provided between the upper housing 158 and the base 151. The sealing sponge is provided on the upper end (open end) of the base 151, such that the steam generated in the atomization cavity 153 can be prevented from escaping from the gap between the base 151 and the upper housing 158, and dirt and the like can be prevented from falling into the water storage tank 152.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A purifier, comprising:
   a housing, including an air outlet and an air duct communicating with the air outlet;
   a fan installed in the air duct; and
   a humidification device installed in the housing and located outside the air duct;
   wherein the humidification device includes an ultrasonic atomization assembly and an exhaust pipe, one end of the exhaust pipe is connected to the ultrasonic atomization assembly, and another end of the exhaust pipe is extended into the air duct, wherein a volute assembly forming the air duct is provided in the housing, the volute assembly includes a volute extending to the air outlet, an end of the volute close to the air outlet is defined with a through hole, and the exhaust pipe is inserted into the through hole.

2. The purifier of claim 1, wherein the housing includes a top plate, and the air outlet is defined on the top plate.

3. The purifier of claim 2, wherein the housing includes a side plate connected to the top plate, and the end of the volute close to the air outlet is inclined from bottom to top towards the side plate.

4. The purifier of claim 1, wherein the ultrasonic atomization assembly includes:
   a base, an atomization cavity being provided on the base, and an ultrasonic source being installed in the atomization cavity;
   an upper housing provided above the base, the upper housing being provided with a cover corresponding to the atomization cavity, the exhaust pipe passing through the cover and communicating with the atomization cavity; and
   a water tank provided on the base to provide a water source for the atomization cavity.

5. The purifier of claim 4, wherein the cover has a cavity with an opening facing downward, the cavity is connected to the atomization cavity, and the exhaust pipe is extended through a side wall of the cover and communicate with the cavity.

6. The purifier of claim 4, wherein the base is provided with a water storage tank communicating with the atomization cavity, and the water tank is provided in the water storage tank.

7. The purifier of claim 6, wherein a spoiler is provided in a water storage tank, and the spoiler includes a first spoiler rib and a second spoiler rib, the first spoiler rib and the second spoiler rib are enclosed to form a spoiler channel, and the spoiler channel is in communication with the atomization cavity.

8. The purifier of claim 7, wherein the first spoiler rib and the second spoiler rib are curved, and the first spoiler rib and the second spoiler rib are enclosed to form a curved spoiler channel.

9. The purifier of claim 7, wherein the first spoiler rib and the second spoiler rib are arc-shaped, and the first spoiler rib and the second spoiler rib are enclosed to form an arc-shaped spoiler channel.

10. The purifier of claim 7, wherein the water storage tank is divided into a first sub-tank and a second sub-tank by the second spoiler rib, the first sub-tank is in communication with the atomization cavity; a water passing hole is defined at a bottom of the second spoiler rib, and the water passing hole is in communication with the first sub-tank and the second sub-tank.

11. The purifier of claim 7, wherein the spoiler includes a plurality of spoiler bumps formed in the water storage tank.

12. The purifier of claim 4, wherein a sealing sponge is provided between the upper housing and the base.

13. The purifier of claim 4, wherein the ultrasonic atomization assembly further includes a blower, and the blower is configured to drive a gas in the atomization cavity to be discharged through the exhaust pipe.

14. The purifier of claim 1, wherein the housing includes a front panel and a rear panel opposite to the front panel, the front panel and/or the rear panel are defined with an air inlet, and the air inlet is provided with a purification module.

15. The purifier of claim 14, wherein a middle partition is provided in the housing, the middle partition and the front panel and/or the rear panel are enclosed to form an installation cavity, and the purification module is installed in the installation cavity corresponding to the air inlet.

16. The purifier of claim 14, wherein the purification module is a HEPA filter.

\* \* \* \* \*